H. J. SPRINGER.
SEED POTATO CUTTER.
APPLICATION FILED JAN. 25, 1911.
1,032,632.
Patented July 16, 1912.
4 SHEETS—SHEET 1.
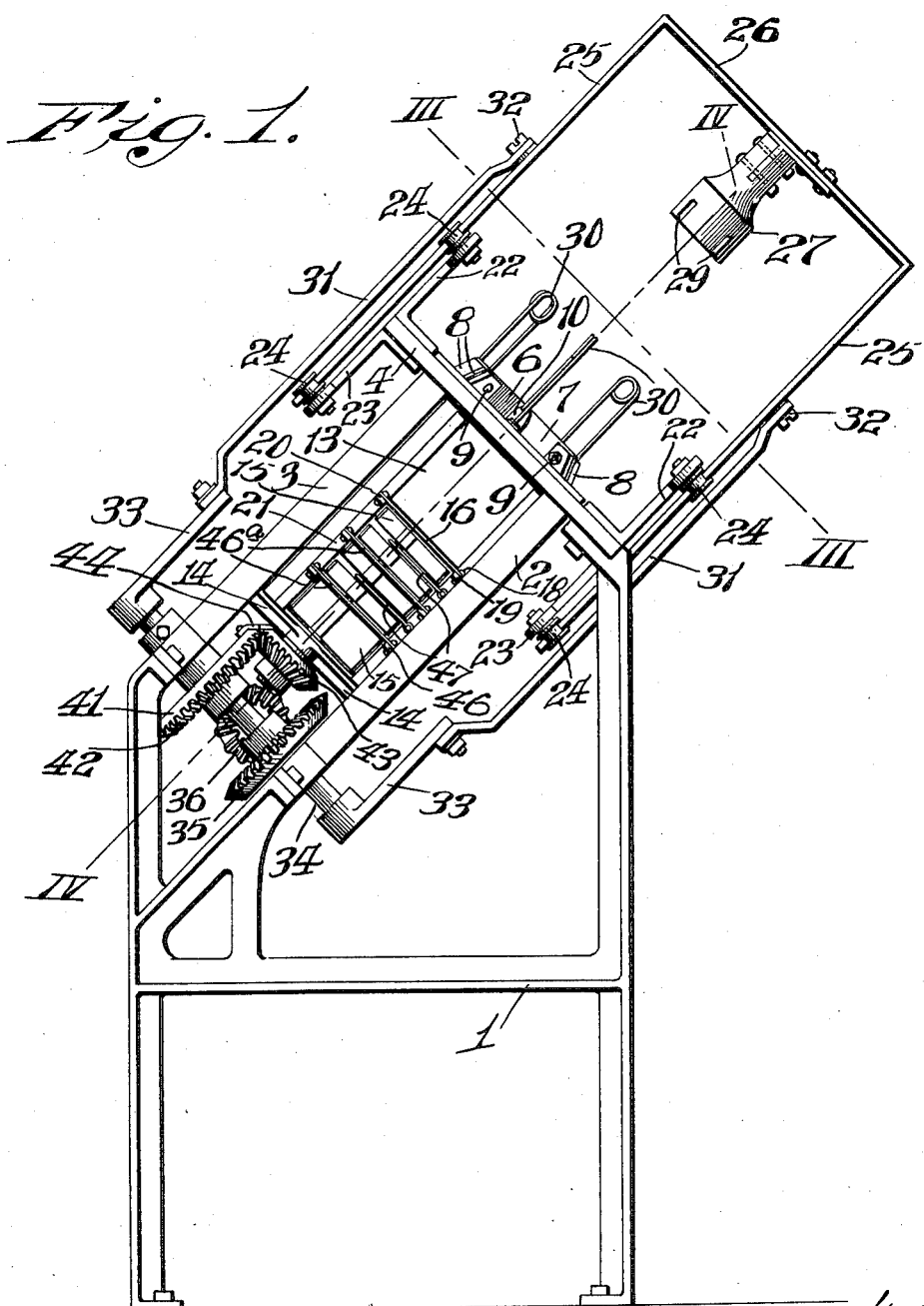

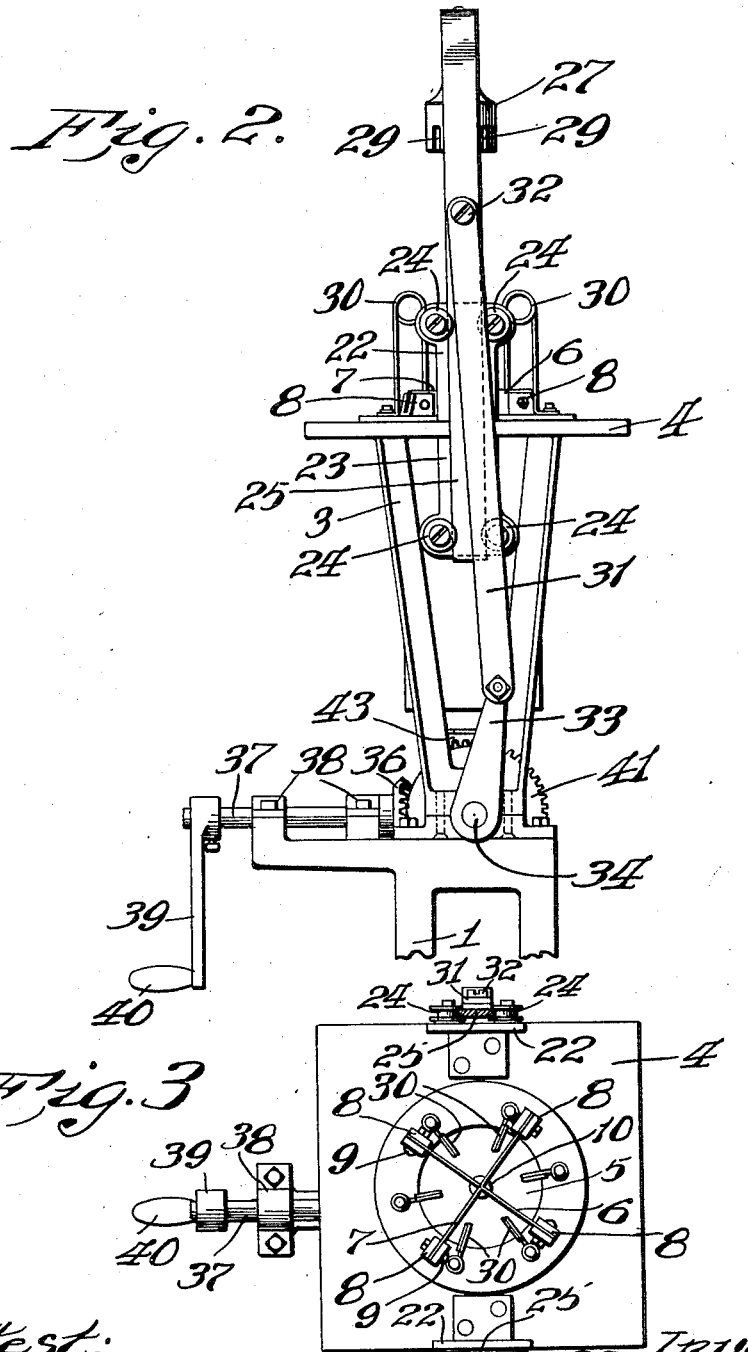

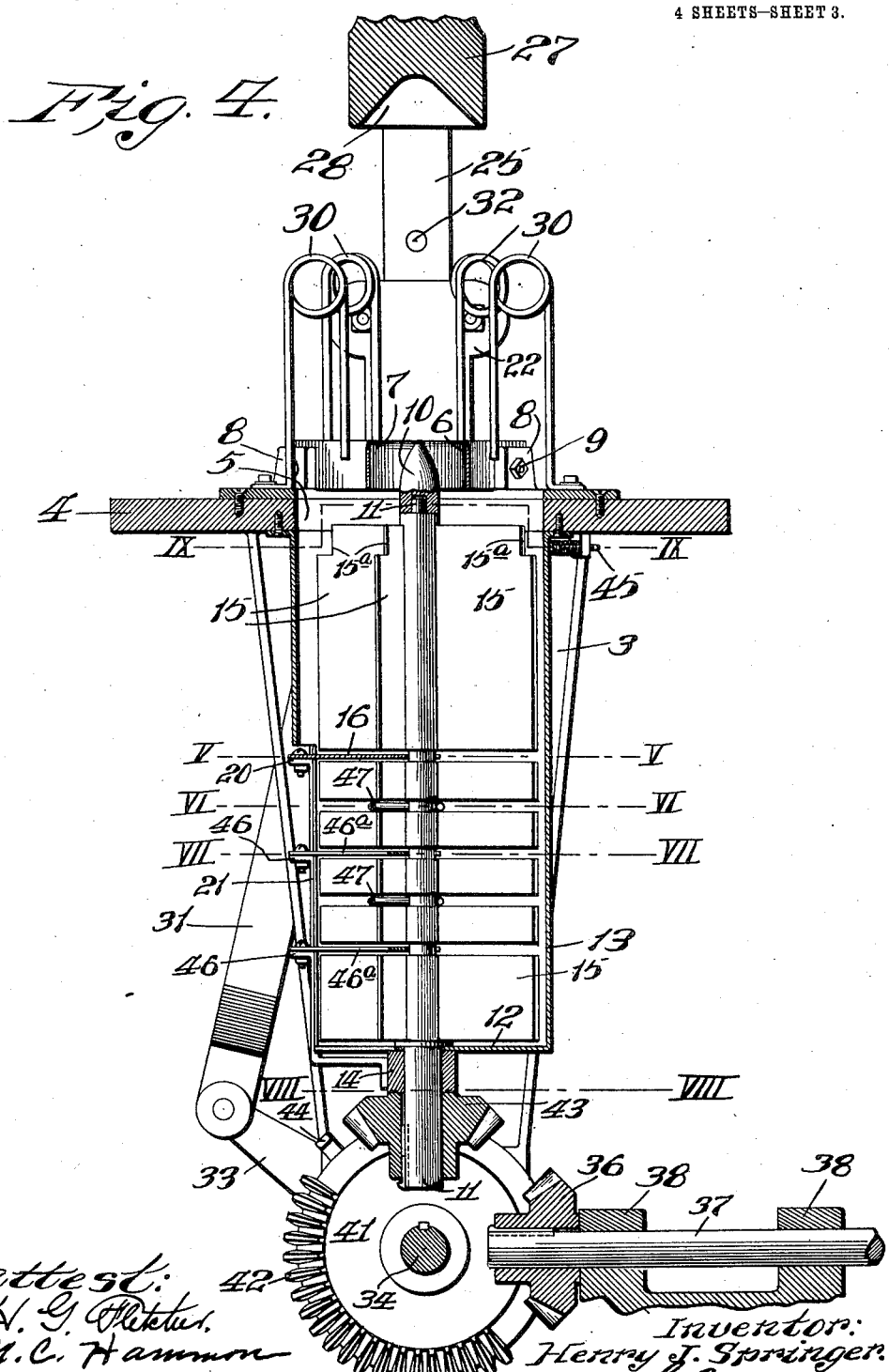

H. J. SPRINGER.
SEED POTATO CUTTER.
APPLICATION FILED JAN. 25, 1911.

1,032,632.

Patented July 16, 1912.
4 SHEETS—SHEET 4.

attest:
A. G. Fletcher
M. C. Hammon

Inventor:
Henry J. Springer
By Knight Bros
attys.

UNITED STATES PATENT OFFICE.

HENRY J. SPRINGER, OF EDWARDSVILLE, ILLINOIS.

SEED-POTATO CUTTER.

1,032,632.  Specification of Letters Patent.  Patented July 16, 1912.

Application filed January 25, 1911.  Serial No. 604,546.

*To all whom it may concern:*

Be it known that I, HENRY J. SPRINGER, a citizen of the United States, and a resident of Edwardsville, county of Madison, State of Illinois, have invented certain new and useful Improvements in Seed-Potato Cutters, of which the following is a specification.

This invention relates to seed potato cutters and has for its primary object to provide an improved construction, combination and arrangement of parts in a device of this character, whereby said potatoes may be continuously cut into pieces for seeding purposes.

One of the objects of the present invention is to provide improved means for cutting a seed potato longitudinally and transversely into pieces of substantially the same size.

More specifically, one of the objects is to provide improved means for cutting the potato sections transversely subsequently to the division of the potato longitudinally.

Another object is to provide improved means for ejecting the cut sections of the potato from the machine.

Figure 5:
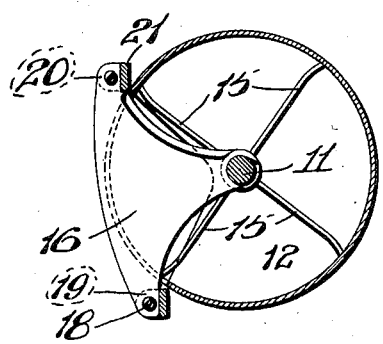
Figure 6:
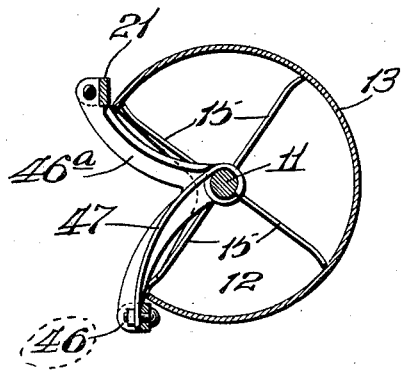
Figure 7:
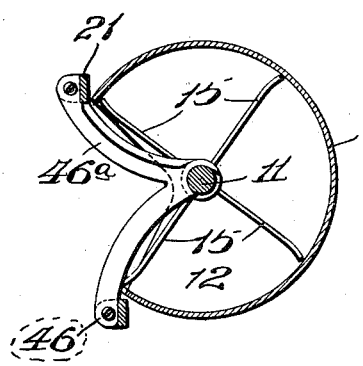
Figure 8:
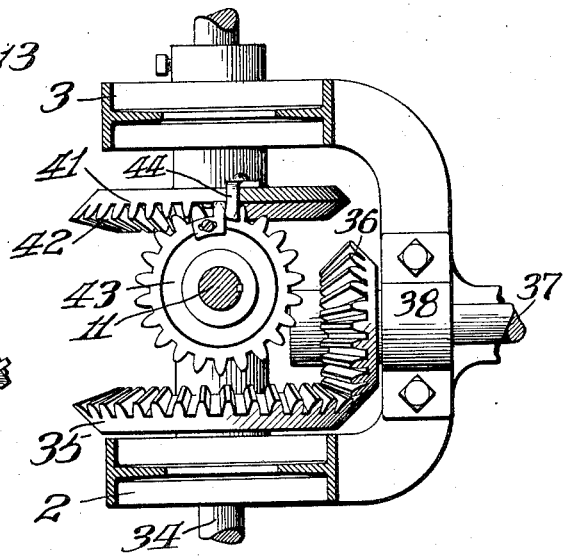
Figure 9:
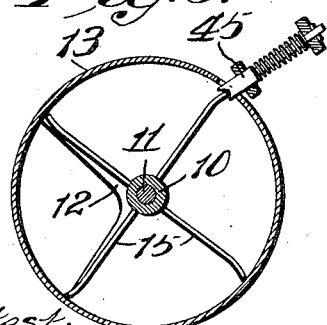

Other and further objects will appear in the specification and be specifically pointed out in the appended claims, reference being had to the accompanying drawings exemplifying the invention and in which, Figure 1 is a side elevation of a complete machine constructed in accordance with the principles of this invention. Fig. 2 is a plan elevation taken on an angle from above the machine and at right angles to the view shown in Fig. 1. Fig. 3 is a section on the line III—III, Fig. 1. Fig. 4 is an enlarged vertical section on the line IV—IV, Fig. 1. Fig. 5 is a section on the line V—V, Fig. 4. Fig. 6 is a section on the line VI—VI, Fig. 4. Fig. 7 is a section on the line VII—VII, Fig. 4. Fig. 8 is a section on the line VIII—VIII, Fig. 4. Fig. 9 is a section on the line IX—IX, Fig. 4.

Referring more particularly to the drawings and to the embodiment shown therein, the potato cutting machine is mounted upon a main frame 1 comprising uprights of greater length on one side than on the other. Rigidly mounted on said main frame and angularly disposed with reference to the uprights of said frame, is a hopper frame comprising side members 2 and 3, the detail construction of which forms no part of the present invention. Rigidly mounted between said side members of said hopper frame is a table plate 4 provided with a central aperture 5 across which are mounted a pair of cutting blades or knives 6 and 7, said blades or knives being constructed and arranged to intersect each other at right angles and supported in position by means of four knife holding blocks 8 within which they are removably secured by bolts 9. Rigidly connected to the blades or knives at their point of intersection, is a bearing block 10 within which is journaled the upper end of a shaft 11. As shown most clearly in Figs. 3 and 4, the bearing block 10 is conoidal in form with its pointed end disposed upwardly and extending approximately to the upper or cutting edges of the knives 6 and 7. The tapered shape of the block 10 adapts it to cover the upper end of the shaft 11 while at the same time it serves to wedge the divided quarters of the potatoes apart as they are forced over the knives. The lower end of the shaft 11 is journaled in the flat bottom wall 12 of a hopper whose cylindrical wall 13 is rigidly secured to the table plate 4 and supported below by rigidly mounted cross bars 14 extending between the side members of the hopper frame.

Rigidly mounted upon the shaft 11, is a pusher head comprising four radially mounted blades 15, said blades being provided with a plurality of spaced slots 16 for a purpose to be hereinafter explained. In the present embodiment, these blades divide the cylindrical hopper into four substantially equal compartments.

A sector-shaped plate or partition 16 is swingingly mounted upon one corner upon a pivot 18 carried by a lug 19 on one of the side members of the hopper frame, another corner of said partition being releasably secured to a similar lug 20 upon a bar extending longitudinally along the cylindrical wall of the hopper between the table plate and one of the cross bars 14. Below this partition, approximately one quarter of the cylindrical wall of the hopper is cut away leaving said hopper open therethrough. The bottom of the hopper is cut away to correspond therewith to permit the discharge of the cut portions of the seed potatoes in the manner to be explained.

Upon opposite edges of the top plate or table 4 are rigidly mounted two pairs of supporting brackets 22 and 23, one bracket of each pair projecting above and the other below said table. Journaled upon each of these brackets is a pair of grooved guide rollers 24 between which are reciprocably mounted a pair of oppositely disposed slide bars 25, whose upper ends are rigidly connected by a cross bar 26. Depending from said cross bar 26, is a plunger head or pusher 27 rigidly secured to said cross bar 26 in any suitable manner. The plunger head or pusher is provided with a cupped recess 28 in its lower face for securely engaging the potato to be forced into the hopper, and in order to adapt said plunger head to force the potato well down into the hopper, it is provided with a plurality of radial slots 29 which are arranged to correspond with the positions of the cutting blades 6 and 7. Resilient means for holding the potato prior to its being forced into the hopper by the plunger, are provided in the present embodiment by a number of spring wire supports 30 which resiliently hold the potato as it is interposed therebetween.

A cutting bar 31 pivoted at 32 at its upper end to each of the slide bars 25 has its lower end pivotally connected to a crank arm 33 on either side of the machine, said crank arms being parallelly arranged and radially mounted upon opposite ends of a power shaft 34 which is journaled in the side members of the hopper frame in the manner shown in the drawing. Keyed to the power shaft 34 adjacent one of the side members of the hopper frame is a bevel gear 35 which meshes with a driving pinion 36 on the end of a power shaft 37, said power shaft being journaled within suitable bearings 38 carried by rigid portions of the hopper frame. In the present embodiment, a crank 39 provided with a handle 40 serves to provide power for the machine. Also disposed between the side members of the hopper frame and spaced from the driven bevel gear 35, is a mutilated bevel gear 41, the toothed portion 42 of which is adapted at certain portions of the revolution of the power shaft, to mesh with a bevel pinion 43 keyed to the lower end of the pusher shaft 11. In order to insure that the toothed portion of the mutilated gear is brought into engagement properly with the beveled pinion 43 at each revolution of the power shaft, a laterally projecting finger 44 is arranged to engage said bevel pinion, and the first tooth of the mutilated gear is shortened so as to make sure that the gears are in motion when they come into mesh. The mutilated bevel gear is suitably disposed upon the power shaft to leave the blades on the rotatable pusher head in alinement with the respective cutting blades or knives 6 and 7. In order, however, to provide suitable means for preventing the momentum of the moving parts causing the blades of the rotary head being carried beyond a position in which they aline with said knives, a spring pressed pawl or stop 45 is arranged to project through the cylindrical wall of the hopper adjacent the top plate or table, said pawl being adapted to resiliently engage each plate as it comes around to rest in the proper position.

Pivotally mounted upon suitable lugs 46 upon the side member 2 of the hopper frame, are a plurality of transverse cutting blades or knives 46ª, spaced at suitable intervals corresponding to the desired sizes of the sections into which the potato is to be divided. These plates are substantially V-shaped to correspond with the angular open space in the hopper, the swinging end of each being releasably connected to the bar 21. Intermediately of the transverse cutting knives are disposed ejector bars 47 which are secured at their outer ends to the side member 2 of the hopper frame and at their inner ends are passed about the shaft 11. These ejectors engage the sections of potato as they are forced between the transverse knives and separating them from the blades and knives, cause them to drop downwardly into any suitable receptacle disposed below the machine.

The operation of the machine will now be understood, and briefly stated is as follows. When the plunger head or follower 27 is in a raised position as shown in the drawings, a potato is interposed between the spring wire supports 30 and as the plunger head descends, is forced over the knife blades 6 and 7 and divided into four quarters. The quarters drop respectively into the several compartments formed within the hopper by the blades of the rotary pusher, being in turn forced laterally against the transverse knives 46 and as the rotary pusher head continues its motion, the ejector bars 47 force them from the knives in the manner already referred to. In order to cause the longitudinally divided sections to move toward the center of the hopper prior to engaging the transverse knives, the entire machine is set at an angle as shown in Fig. 1, in which position the pair of blades of the radial pusher head which are just approaching said transverse knives, form a V-shaped recess with the apex lowermost.

What I claim is:

1. In a device of the character described, the combination with a cylindrical hopper disposed on an inclined axis, said hopper being provided with a discharge opening in its lateral wall adjacent its lower end, of a pair of cutting blades extending across the upper end of said hopper, said blades being disposed perpendicularly to each other, and resilient means disposed at the upper end of said hopper in the angular spaces between said cutting blades, said means being adapted to hold a potato, a plurality of transverse cutting blades disposed transverse to the axis of said hopper and across the discharge outlet, a rotary head within said hopper, said head comprising radially disposed blades dividing said hopper into four compartments corresponding to the longitudinal sections into which the potato is divided, said blades being adapted to force said sections of the potato successively against said transverse knives to divide said sections transversely as they are discharged from the hopper, and a plunger reciprocable relatively to said hopper to force a potato downwardly thereinto across said knives at the upper end thereof.

2. In a device of the character described, the combination with a hopper provided with a discharge opening, of cutting blades within said hopper with their cutting edges disposed upwardly other cutting blades disposed transversely to and below the first said cutting blades, a rotary head within said hopper and comprising radially disposed blades dividing said hopper into compartments corresponding to the arrangement of the first said blades; said radially disposed blades being slotted to adapt them to pass over the second said cutting blades, and a plunger reciprocable relative to said hopper and above the first said cutting blades to adapt it to force a potato downwardly into the hopper over the first said cutting blades.

3. In a device of the character described, the combination with a hopper, of cutting blades disposed to cut potatoes introduced therein into longitudinal sections, a rotatable pusher for moving said longitudinal sections around in the hopper, transverse cutting blades against which said pusher is adapted to force the longitudinal sections, and ejector bars between adjacent transverse blades for separating the potato sections from said pusher.

4. In a device of the character described, the combination with a hopper provided above with blades for separating a potato longitudinally, and below with fixed blades for separating the longitudinal sections transverse of a plunger movable toward and away from said hopper to force the potato against the upper blades, and means for separately receiving said longitudinal sections and forcing them one by one against said fixed blades.

5. In a device of the character described, the combination with a hopper provided with an outlet opening, cutting blades disposed edgewise in the end of said hopper and adapted to cut potatoes introduced therein into longitudinal sections, a rotatable pusher for moving said longitudinal sections to the outlet opening, a plurality of transversely arranged cutting blades for dividing said longitudinal sections transversely, and means between adjacent transverse blades for overcoming the adhesion between said pusher and the potato section.

6. In a device of the character described, the combination with a hopper, of a rotatable pusher within said hopper, said pusher comprising a plurality of radially disposed plates forming compartments within said hopper, cutting blades disposed in the open end of said hopper and adapted to cut a potato into longitudinal sections corresponding with the compartments in said hopper, and a plurality of transverse blades disposed within said cylinder for cutting said potato sections transversely, the blades of said rotary pusher being provided with slots permitting them to pass over said transverse blades, and the wall of said hopper being broken away adjacent said blades to permit the discharge therefrom of the potato sections.

7. In a device of the character described, the combination with a cylindrical hopper, of a rotatable pusher coaxial therewith and having radially disposed blades forming compartments within said hopper, radially disposed cutting blades in the upper open end of said hopper, said blades being adapted to cut a potato forced into said hopper, into longitudinal sections, transverse blades disposed within said hopper, the cylindrical wall of the hopper being broken away adjacent said blades to provide a discharge opening, means for forcing a potato over the longitudinally dividing knives, means for rotating said pusher to force the longitudinal sections on the potato against said transverse knives, and common means for rotating said pusher periodically and reciprocating the means for forcing the potato into the hopper.

8. In a device of the character described, the combination with a cylindrical hopper provided with an opening in its cylindrical wall, of a plurality of transverse cutting blades disposed within said opening, a rotatable pusher within said hopper and provided with radially projecting arms overreaching said transverse blades, said pusher blades being provided with slots adapting said pusher blades to pass over said cutting blades, means for engaging said rotatable pusher after each periodical movement, other cutting blades disposed in the open end of the cylinder to correspond with the pusher blades in their positions of rest, and means extending from the axis of the rotatable pusher to the outside of the hopper for severing the divided sections from said pusher.

9. In a device of the character described, the combination with a cylindrical hopper, a pusher rotatably mounted on the axis of said hopper and having a plurality of radially disposed pusher blades, said blades being provided with spaced slots, intersecting cutter blades arranged in the upper open end of said cylinder, a reciprocable plunger for driving a potato over said blades to divide it into longitudinal sections, means for holding said rotary pusher stationary during said cutting operation, the positions of the pusher blades corresponding with the positions of said knives, and transverse cutting blades within said hopper, said pusher blades being adapted to pass over said blades by reason of the slots in said pusher blades, and means for coöperatively operating said parts.

10. In a device of the character described, the combination of a hopper, cutting blades disposed in the open end of said hopper for cutting a potato into longitudinal sections, a pusher comprising radially disposed blades forming compartments for respectively receiving said sections, and spaced transverse blades across which said pusher blades pass in forcing said sections separately thereagainst.

11. In a device of the character described, the combination with a hopper open at the top, of a plurality of transverse cutting blades mounted within said top opening, a bearing block rigid with said blades at their point of intersection, said bearing block being tapered to a point with the point uppermost, a shaft extending through said hopper from top to bottom, the upper end of said shaft being journaled in said bearing block, and a plurality of blades projecting radially from said shaft, said blades being arranged to divide the hopper into compartments corresponding to the angular spaces between said cutting blades.

12. In a device of the character described, the combination with a hopper open at the top, of a plurality of transverse cutting blades mounted within said top opening, a bearing block rigid with said blades at their point of intersection, said bearing block being tapered to a point with the point uppermost, a shaft extending through said hopper from top to bottom, the upper end of said shaft being journaled in said bearing block, a plurality of blades projecting radially from said shaft, said blades being arranged to divide the hopper into compartments corresponding to the angular space between said connecting blades, and means coöperating between the hopper and said blades to lock the shaft against movement when the blades on the shaft correspond in position to the cutting blades in the top of the hopper.

HENRY J. SPRINGER.

In the presence of—
 WM. D. HARNIST,
 E. C. SPRINGER.

Copies of this patent may be obtained for five cents each, by addressing the "Commissioner of Patents, Washington, D. C."